(12) United States Patent
Leonard

(10) Patent No.: US 6,516,966 B1
(45) Date of Patent: Feb. 11, 2003

(54) UTILITY METER MOUNTING PANEL

(76) Inventor: Donivan A. Leonard, 12 Anjo Dr., Sauk Center, MN (US) 56378

( * ) Notice: Subject to any disclaimer, the term of this patent is extended or adjusted under 35 U.S.C. 154(b) by 199 days.

(21) Appl. No.: 09/685,522

(22) Filed: Oct. 10, 2000

(51) Int. Cl.[7] ............................................. B65D 43/00
(52) U.S. Cl. .................... 220/480; 220/3.2; 220/3.3; 220/3.94
(58) Field of Search ................. 220/480, 481, 220/4.02, 3.2, 3.3, 3.94

(56) References Cited

U.S. PATENT DOCUMENTS

| | | |
|---|---|---|
| 1,134,257 A | 4/1915 | Chase |
| 1,511,636 A | 10/1924 | Rypinski |
| 1,601,606 A | 9/1926 | Waller |
| 1,606,893 A | 11/1926 | Palmer et al. |
| 1,739,142 A | 12/1929 | Hill et al. |
| 1,966,301 A | 7/1934 | Lewis |
| 5,476,183 A * | 12/1995 | Harpenau ................... 220/3.3 |
| 5,594,205 A * | 1/1997 | Cancellieri et al. ...... 220/3.2 X |
| 5,598,670 A | 2/1997 | Humphrey al al. |
| 5,722,208 A | 3/1998 | Humphrey et al. |
| RE35,983 E | 12/1998 | Crowley |
| 5,952,610 A | 9/1999 | Bosse, Jr. |
| 5,967,354 A * | 10/1999 | Whitehead et al. .... 220/3.94 X |
| 6,051,786 A | 4/2000 | Gretz |
| D427,889 S | 7/2000 | Gretz |
| 6,242,698 B1 * | 6/2001 | Baker, III et al. ....... 220/3.3 X |
| 6,279,768 B1 * | 8/2001 | Mendoza et al. ...... 220/3.94 X |

* cited by examiner

Primary Examiner—Steven M Pollard
(74) Attorney, Agent, or Firm—Albert W. Watkins

(57) ABSTRACT

A highly adaptable mounting panel has a planar surface for supporting various devices including an electrical meter thereon. The planar surface is elevated from a surrounding flange, which may be operatively fastened to a wall or similar building structure. The surrounding flanges are beveled to interlock the panels together and extend the coverage of the planar surface to an area covered by two or any multiple of modules. Guides and selective reinforcements are provided to ensure simple, rapid and secure fastening between adjacent panels. Additional brackets are disclosed which permit the mounting panel to be used in conjunction with brick or stone siding.

16 Claims, 7 Drawing Sheets

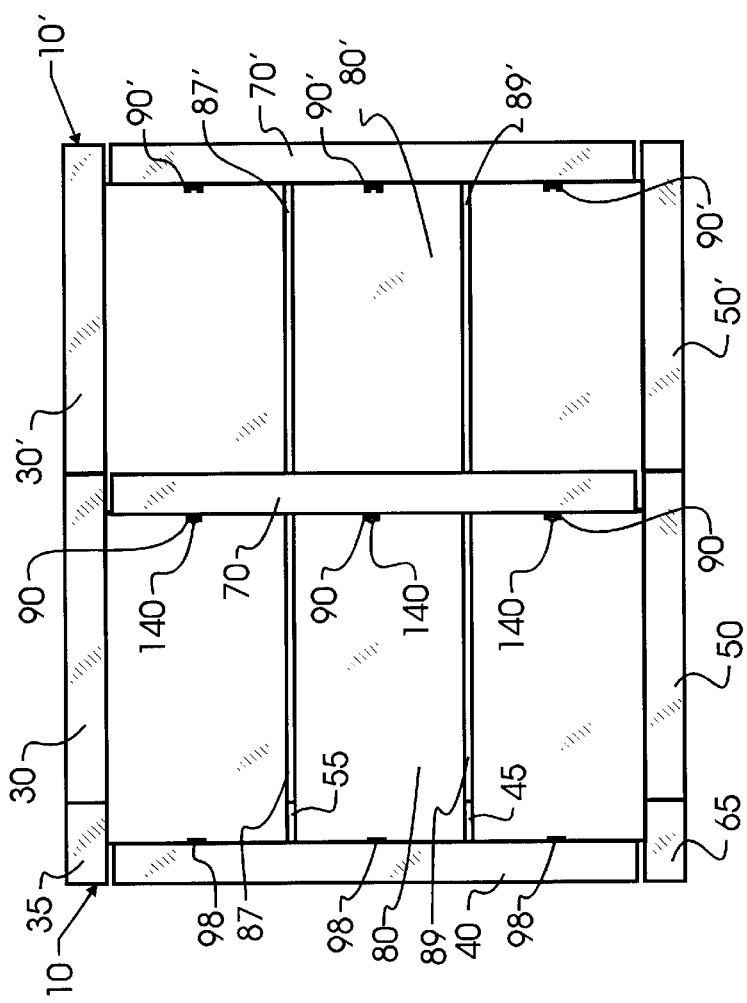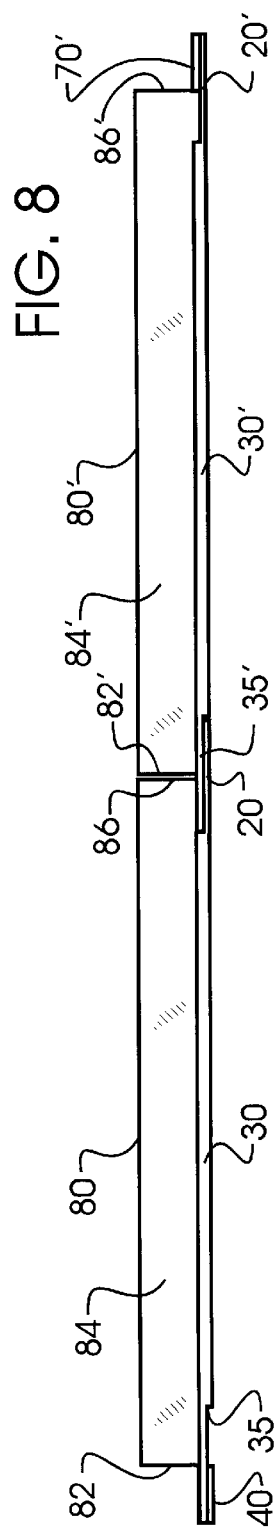

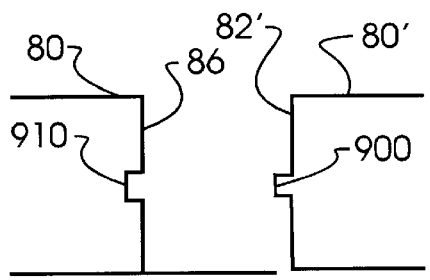
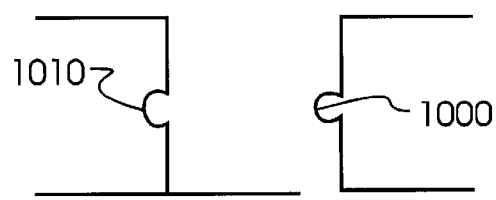
FIG. 9　　　　　　FIG. 10
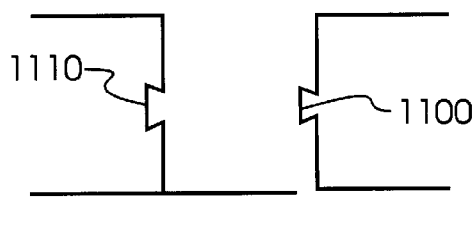
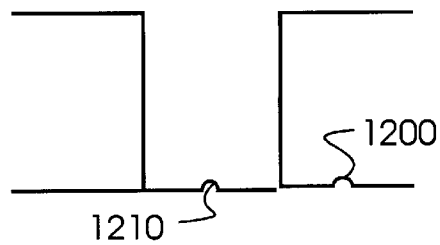
FIG. 11　　　　　　FIG. 12
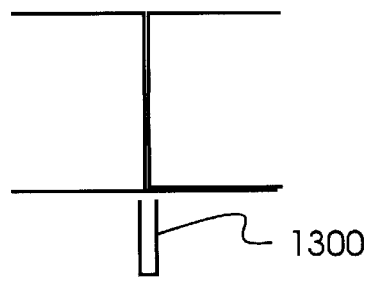
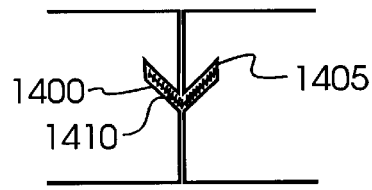
FIG. 13　　　　　　FIG. 14

UTILITY METER MOUNTING PANEL

BACKGROUND OF THE INVENTION

1. Field of the Invention

This invention pertains generally to wall-mounting panels for supporting various components and devices, and more particularly to a device for mounting and supporting electrical equipment upon an exterior wall of a static structure such as a building. In a most particular embodiment, the invention pertains to wall-mount panels for electrical meters.

2. Description of the Related Art

Various utilities are provided to most residences and businesses. Water, electricity, heating and air conditioning, cables for video and computer communications, and other similar utilities may be provided from an exterior source through the walls and into an interior of a building structure. Depending upon the building structure, various accommodations must be made to provide appropriate support for the utility link at the exterior surface of the building. Several of the utilities are provided with meters which may be used for measuring and billing purposes, and these meters must also be supported upon the building exterior. Unfortunately, not all building structures provide suitable mounting surfaces for these various utility connections and meters.

One approach to the installation of the various service connections and meters has been to attach these components directly to the structural components of the building, such as lumber or metal studs within a wall. Unfortunately, these various components tend to have very irregular outlines, or footprints, upon the wall. When exterior siding is applied to cover the wall, the siding material must then be cut to conform to the irregular pattern. This is difficult to do, and adds unwanted expense. This type of installation is also a source for problems such as moisture leaks and the like. The problem will only be worse if the device later requires replacement with a component having a larger or smaller dimension.

Some attempts have been made to mount various service components and utilities to the exterior siding of a building. Exterior siding is often decorative in nature, and most commonly presents a very irregular surface. For example, many residences are sided with lap siding, which presents a surface which, in cross-section, has a saw-tooth appearance. Irregular surfaces are much more difficult to mount utility connections and meters onto than flat surfaces, and this lap siding makes mounting relatively more difficult. Besides the possibility of an irregular surface, siding may also be manufactured from many different materials and thicknesses, some which may be more or less suitable for mounting. Some types of siding are relatively easily damaged during the installation of fasteners such as screws or nails, and this damage may lead to premature corrosion, rotting, decay, or the like. For example, steel siding requires very particular handling to prevent the loss of zinc or other galvanic coatings, and improper drilling or sawing will remove the coating and lead to premature rusting. Various woods or composites must be very carefully sealed to prevent moisture from penetrating into the region adjacent the fastener. Other types of siding are not physically strong and rigid enough to support a utility connection or meter, and may in fact distort during or subsequent to installation. Yet other siding is so solid or dense as to present a surface which is extremely difficult to directly fasten into, such as brick or stone.

The vast array of materials and geometries of exterior building surfaces has always presented a challenge to the introduction of various utilities into the building interiors. Further compounding this difficulty is the fact that these utility service components are occasionally in need of repair or replacement. Even when an installation has been performed successfully, later removal of components for service or replacement is difficult. Consequently, the underlying static structure may still be damaged.

Various artisans have sought to provide mounting plates or panels which provide a flat surface of predictable composition, act as a mounting support for the utility and meter and provide for removal and replacement of certain components, such as electrical meters, without adversely affecting the underlying building surface. For example, U.S. Pat. No. 1,134,257 to Chase; U.S. Pat. No. 1,511,636 to Rypinski; U.S. Pat. No. 1,601,606 to Waller; U.S. Pat. No. 1,606,893 to Palmer et al; U.S. Pat. No. 1,739,142 to Hill et al; and U.S. Pat. No. 1,966,301 to Lewis, each incorporated herein by reference, illustrate various panels which support meters against a static structure. These panels permit a meter to be mounted and removed for servicing or replacement with minimal disturbance or disruption of the building wall underlying the mounting panel. Nevertheless, and particularly with the advent of newer siding materials including steel and vinyl lap siding, these panels have not proved to be satisfactory in the field. Consequently, new mounting panels have been sought which may provide improved attachment between the underlying building and such devices as electrical meters or the like.

Several more recent mounting panels are illustrated in U.S. Pat. Nos. 5,598,670 and 5,722,208 to Humphrey et al; and U.S. Pat. No. 6,051,786 to Gretz, the contents of each incorporated herein by reference. In the Humphrey et al patents, special flanges are provided that are designed to receive siding, such as various lap siding, within or partially sandwiched by the flanges. Beneficially, these flanges allow significant tolerances in the cutting of the siding material, since the flanges tend to conceal any imperfections or discrepancies between the mounting panels and siding. Unfortunately, not all types of siding may be sufficiently thin to pass between the flanges, or, where the flanges are designed larger, some types of siding will look inappropriate within the large flanges. Moreover, some types of siding such as brick or stone, may not be suited at all for this type of mounting panel. Consequently, the use of the Humphrey et al flanges undesirably limits the application for these panels. In the Gretz patent, a two-piece siding box is configured for custom applications such as outlets, switches or light fixtures. Nevertheless, no means is provided for planar mounting of a variety of utilities or service components, nor is there any provision for extending the Gretz component to multiple support surfaces. Consequently, the Gretz panel is limited strictly to a single, relatively small component for which the panel was designed.

What is desired then is a mounting panel which, through only minor modification not requiring additional tooling or inventory, is suitable for use with an exceptional range of building exterior materials and geometries, and which will accommodate a wide range of components. Most particularly, a simple-to-install panel having these and other characteristics outlined herein below has been demanded by people in the field for many years. The prior inventions have not fully addressed each of the needs of the people. The present invention not only fulfills these characteristics, but provides exceptional and novel further benefits.

SUMMARY OF THE INVENTION

In a first manifestation, the invention is a mounting panel for supporting diverse components upon a surface. First and second edges extend from the surface. A means is provided for guiding a fastener into the first edge, and a means is provided for reinforcing the second edge for receiving a second fastener. There is additionally a flange extending parallel to the surface but offset therefrom.

In a second manifestation, the invention is a wall-mount panel in combination with a removably mounted electrical meter, the combination engaged with an exterior building vertical wall.

The wall mounted panel has a planar and consistent surface which will receive a first fastener at any point and onto which the electrical meter may operatively be fastened. Four edges extend from the surface normal thereto, and form a rectangular perimeter about the surface. A means is provided for guiding a second fastener into one of the four edges from a direction normal thereto. The guiding means has two spaced ridges and defines a valley therebetween. A second elevated portion extends partially and not completely between the two ridges, thereby creating a low region between ridges. The low region is dimensioned to receive a fastener without the fastener passing through the spaced ridges. A means is also provided for reinforcing one of the edges for receiving a fastener. The fastener guiding means and reinforcing means are aligned along opposed edges and align when two of said wall mount panels are placed immediately adjacent each other. Four relatively planar flanges each have a connection to ones of the four edges, and extend parallel to the surface. Nevertheless, they are offset therefrom in a direction normal to the surface, and each extend from the four edges in different directions. At least one of the flanges has a tab comprising a region which is thinner than the thickness of a remainder of the flange, and has a notch separating the tab from the remainder of the flange. Additional features are contemplated, including the further combination of an additional electrical component, and an additional electrical meter.

In a third manifestation, the invention is an expandable mounting panel for mounting electrical meters and the like. Two adjacent, like modules, each have flanges for attachment to a building surface and a surface raised from the flanges for supporting various electrical components including electrical meters. A first engaging tab on one of the modules contacts an engaging tab on the other module along a first axis. A first abutting edge on one of the modules contacts a second abutting edge on the other of the modules along a second axis. The second axis is different from and not parallel to the first axis.

OBJECTS OF THE INVENTION

A first object of the invention is to provide a mounting surface onto which various components may be readily affixed. A second object of the invention is to enable this mounting surface to be installed easily. A third object of the invention is to enable this surface to be installed at any angle, upon a wide variety of surfaces including but not limited to floors, interior walls and exterior walls. A further object of the invention is to allow this surface to be installed prior to the time of installation of siding materials, and make the installation of siding materials easier than without the present invention while simultaneously reducing calls back to the work-site for repair or touching-up imperfections. Another object of the invention is to enable the ganging of multiple mounting surfaces together to serve the function of a single, much larger mounting surface, so that different size requirements for planar mounting surfaces may be accommodated without the need for additional stock or inventory of parts. Yet a further object of the invention is the provision of a mounting surface which is readily mounted with exterior siding of diverse compositions and geometries, and which may be readily sealed therewith to provide a weather resistant moisture and insect barrier to a building exterior. These and other objects are achieved in the present invention, which will be best understood by illustration of a preferred embodiment taken in conjunction with the appended drawing figures.

BRIEF DESCRIPTION OF THE DRAWINGS

FIGS. 7 and 8 illustrate two preferred embodiment mounting panels ganged together adjacently from a bottom plan view and an end view, respectively.

FIGS. 9–15 schematically illustrate various alternative fastening techniques that may be used in the present invention to gang together multiple panels.

DESCRIPTION OF THE PREFERRED EMBODIMENT

Mounting panel 10 illustrates the most preferred embodiment of the invention, which includes a generally rectangular, planar surface 80 onto which various utility components may be mounted. The geometry or dimension of planar surface is not critical to the operation of the invention, though, as will be discussed hereinbelow, shapes such as squares and rectangles are most preferred for applications where multiples of panels 10 may be tied together to form larger modules. Nevertheless, other shapes and geometries are contemplated herein, including hexagons, circles, triangles and other shapes whether geometrically consistent or otherwise. Most preferably, planar surface 80 is well-suited for the attachment of these utility components, such as by screw, nail or other known fastening means. While this surface may alternatively be irregular either in composition or surface geometry (non-planar), this is less preferred since the invention will have more limited application than a planar and consistent surface. Additionally, installation of a device may be hampered by the lack of planarity or consistency, where in the preferred embodiment a device may be easily placed with little regard for locations on panel 10.

A variety of materials may be well-suited for the manufacture of panel 10, and are contemplated herein. Preferably, the material of choice will have excellent weather resistance, low flammability, be electrically non-conductive, and also be sufficiently frangible to allow removal of tabs, as described hereinbelow, during installation. Most preferably, the material of choice will further be readily manufactured for a low cost, and be readily drilled through and attached to. In view of the preferred features, a number of plastic materials are preferred. Polystyrene is most preferred, owing to relatively low cost of material, low cost of manufacture, ease of attaching to, and the frangible nature of the tabs. Metals may be used alternatively, where adequate steps have been taken to protect the metal from corrosion and adapt the teachings of the present invention to permit the forming of the metal at adequately low costs to maintain viability in the marketplace, and where the inherent electrical conductivity and relatively more difficult drilling and machining in the field are not important. Other known materials may, of course, also be used alternatively.

Figure 1:
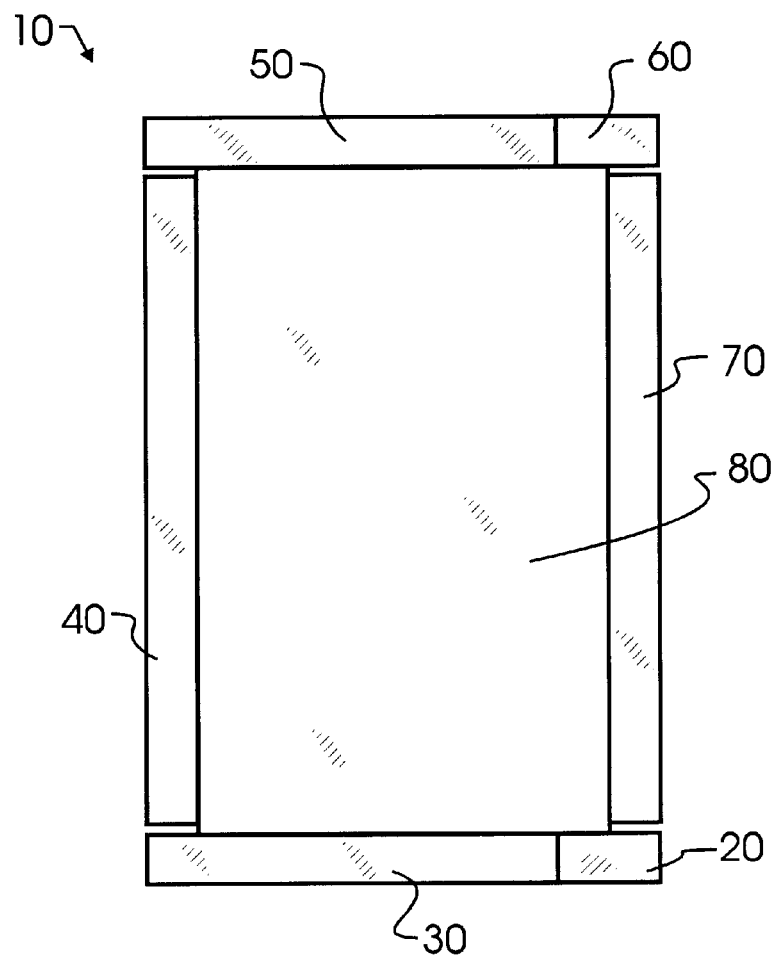
FIG. 1 illustrates a preferred embodiment mounting panel designed in accordance with the teachings of the present invention from a top plan view.
Figure 2:
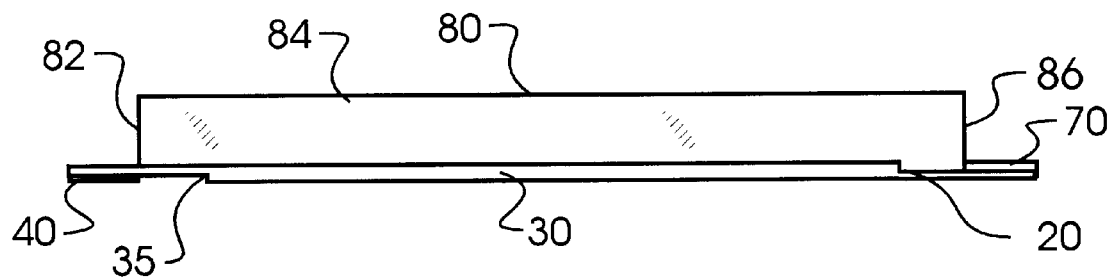
FIG. 2 illustrates the preferred embodiment mounting panel of FIG. 1 from a side plan view.

Panel 10 includes, in addition to relatively planar and consistent surface 80, four edges 82, 84, 86 and 88, and four flanges 30, 40, 50 and 70. Flanges 30 and 50 have tabs 20 and 60 which are somewhat thinner than the majority of flanges 30 and 50. Flanges 30,40,50 and 70 are not connected continuously about a perimeter, and so are separable one from another. Furthermore, one or more flanges 30, 40, 50 and 70 are most preferably provided with a means for separation from the immediate supporting edge. In the preferred embodiment, this is accomplished by molding the flange with less plastic at the juncture between the selected flanges and edges. In the most preferred embodiment, only flanges 30 and 70 are provided with an emphasized frangible or break-away feature. Nevertheless, and owing in part to the most preferred material, all four flanges may still be broken away for application that so require, such as some brick and stone applications. As can be observed in FIG. 2, the tabs are arranged to be complimentary, so that thinned tab 20 and thinned tab 35 align.

Figure 6:
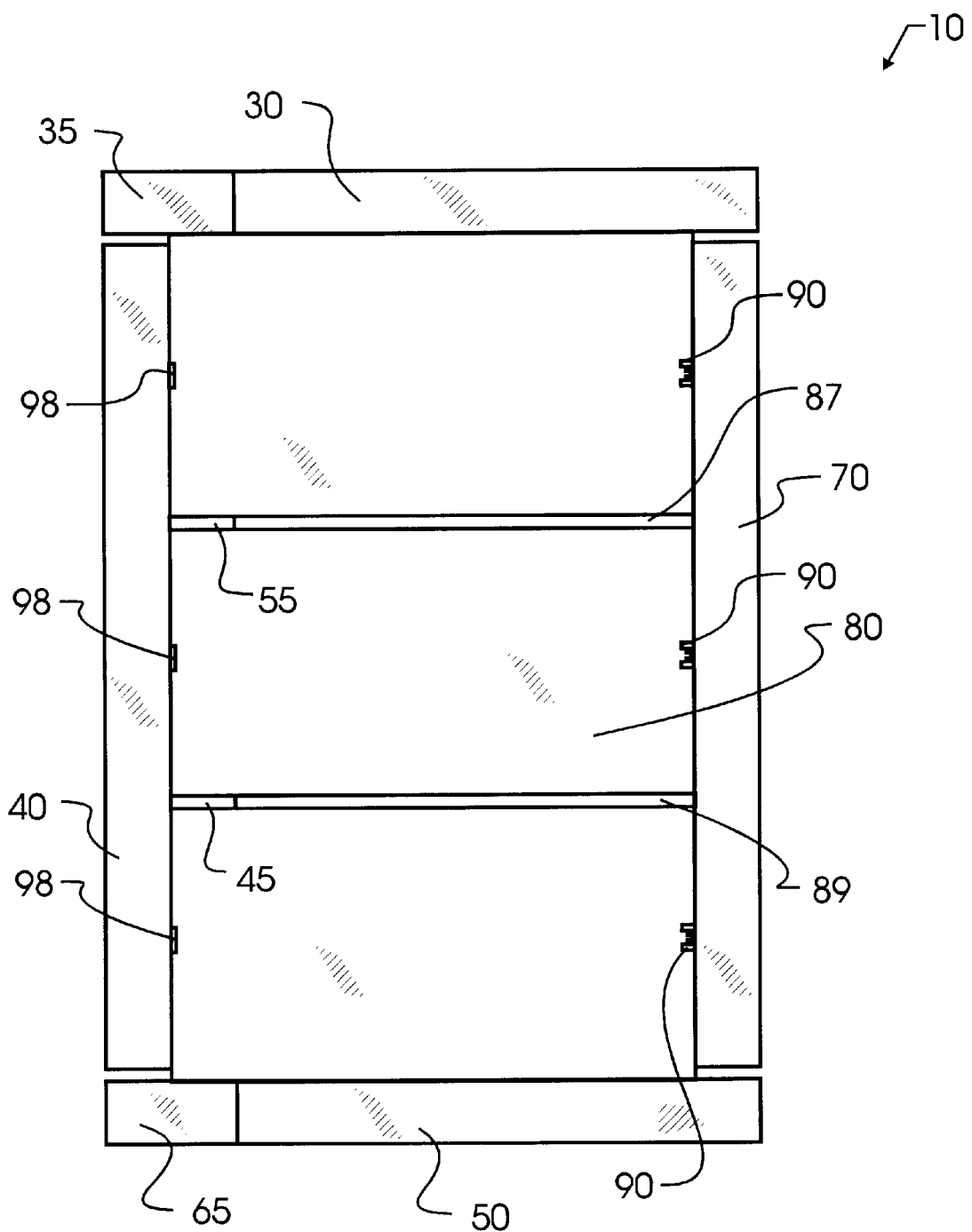
FIG. 6 illustrates the preferred embodiment mounting panel of FIG. 1 from a bottom plan view.

As can be best seen from FIG. 6, each panel 10 is further provided with small reinforcements 98 adjacent edge 86, which in a plastic molded embodiment of panel 10 will simply be a slightly thicker dot or strip. Adjacent opposing edge 82, but spaced equidistantly along edge 82 as reinforcements 98 are placed along edge 86, are fastener guides 90. These guides 90 are used to direct screws precisely into the material of edge 86, and ensure exact alignment with an adjacent panel reinforcement 98.

Figure 3:
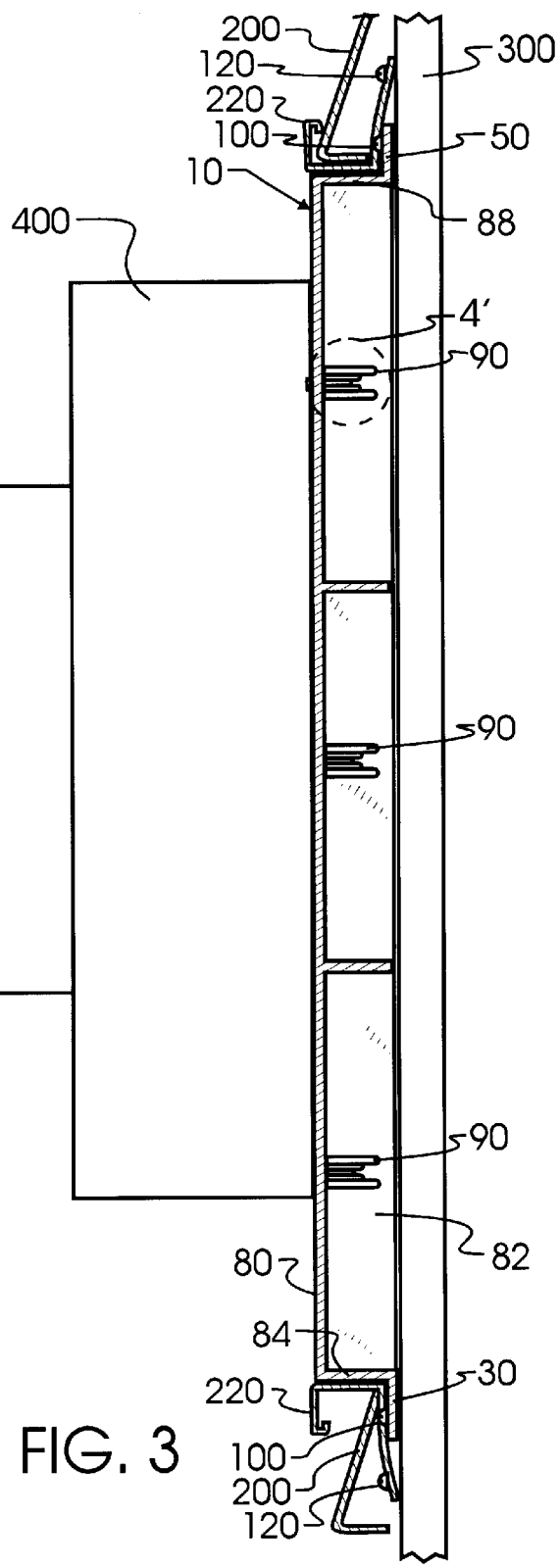
FIG. 3 illustrates the preferred embodiment mounting panel of FIG. 1 in further combination with an electrical meter, from a side cross-sectional view.

FIG. 3 illustrates a preferred combination panel 10, from a partial cross-section view, with electrical meter 400. In this embodiment of the invention, panel 10 will preferably be attached to an underlying structural support 300 which may be a board, sheathing or other structurally sound material. Fasteners 100 are illustrated, and may be nails, screws, or the like. The exact type of fastener is not consequential to the invention, and even adhesives maybe used in situations where the use of an adhesive fastening would be preferred. While the illustrated preferred embodiment of panel does not provide holes for fasteners 100, holes may optionally be provided. Meter 400 may then be directly attached upon surface 80, and once again the particular fasteners used are not consequential to the invention. Nevertheless, it is preferred to use a material for panel 10 which readily receives a variety of fasteners or methods of attachment, including such common fasteners as screws, nails, and adhesives. From the view of FIG. 3, it is apparent that there is no limitation where upon surface 80 meter 400 is placed. This is preferred, to accommodate as wide a range of devices as possible for support on or passage through panel 10. Reinforcing beams 87 and 89 will be provided when the surface area or any dimension of surface 80 is great enough that additional mechanical support will be preferred. Beams 87 and 89 will prevent surface 80 from being damaged by being forced to flex towards structural support 300, as might otherwise occur, for example, when meter 400 is being fastened to surface 80. Where siding such as vinyl or metal siding 200 is used, there will typically be a J-channel 220 which was designed by the siding manufacturer to mate directly with siding 200 and form a visually appealing juncture therewith.

Figure 4:
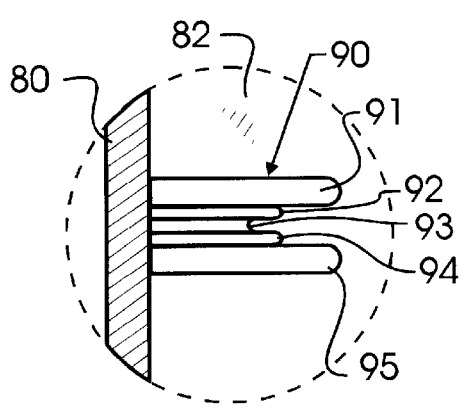
FIG. 4 illustrates a fastener alignment guide used in the preferred embodiment mounting panel by magnified sectional view.
Figure 5:
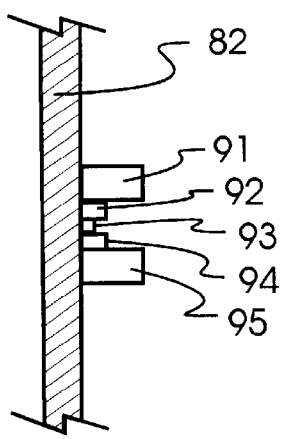
FIG. 5 illustrates the alignment guide of FIG. 4 from an edge view.

FIGS. 4 and 5 illustrate the fastener guides 90 in much greater detail, and, as evidenced therein, vertical strips 91 and 95 are elevated sufficiently to act as guides for screws or other similar fasteners. Two smaller vertical strips 92 and 94 provide a second step, or elevation, and finally strip 93 fills much of the space, but not all, between strips 92 and 94, but again on a lower level. This combination of strips 91 and 95 provides a supporting surface for the head of a fastener when the fastener is installed, and the edges of strips 91 and 95 help to guide a fastener into alignment normal to edge 86. Strips 92–95 provide a very precise guide for the point of the fastener at the time of installation, making the attachment of two identical panels a very simple and quick process.

In operation, where two or more panels 10 are to be joined adjacent each other, one of flanges 70 and 40 will conflict with the other panel's counterpart, or, for top-to-bottom stacking, one of flanges 30 and 50 will conflict. Consequently, flange 30 will be removed if the panels are to be ganged vertically, while flange 40 will be removed if the panels are to be ganged horizontally. From FIG. 2, it will be apparent that tab 20 may then be slid under a tab such as tab 35. In this case, as illustrated in FIGS. 7 and 8, the two like panels 10 and 10' are brought adjacent one another. This alignment of tabs 20 and 35 serves as a preliminary alignment, and edge 86 of panel 10 will abut with edge 82' of panel 10'. While FIGS. 7 and 8 only illustrate the assembly of two like panels to form a larger module, it will be apparent from the teachings herein that as many panels as may be reasonably desired can be assembled together to form a much larger module. Furthermore, the panels do not have to be simply side-to-side attached as illustrated, but may also be provided with means such as fastener guides 90 and reinforcements 98 along the top edge 88 and bottom edge 84 to enable these edges to be abutted. Once the two panels are abutted adjacent each other, fasteners such as sheet metal screws may be used without separate pre-drilling to penetrate through the plastic material of edge 86 and into reinforcements 98'.

Figure 15:
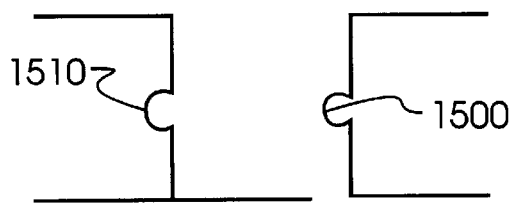

Other fasteners are contemplated, which serve as alternatives to fastener guides 90 and reinforcements 98. These alternative fasteners are illustrated in FIGS. 9–15. FIG. 9 illustrates a male button 900 which slides or is pressed into a receiving hole 910. This may be a simple slide-in design, or male button 900 may be designed to interfere slightly with receiving hole 910 to firmly engage therewith when edge 82' is abutted with edge 86. One or a plurality of such buttons may be provided along each of the edges 82–88 to enable secure attachment of adjacent panels. FIG. 10 illustrates a schematic edge view of a tongue-and-groove connection between adjacent panels, tongue 1000 designed to slide into groove 1010, as is known in the building trade for materials such as flooring. FIG. 11 illustrates a tapered button 1100 which can be pressed into tapered receiving hole 1110. Button 1100 is specifically designed to provide substantial interference with hole 1110, and is not designed for removal unless the material chosen offers a great deal of resilience. FIG. 12 illustrates the concept that these various fastening alternatives do not solely have to be achieved directly at the interface between edges 82–88, but that they may further be incorporated into flanges 30,40,50 and 70 as well, in this figure showing a tongue and groove interlock similar to tongue 1000 and groove 1010, only in this figure tongue 1210 is formed in flange 70 and a mating groove 1200 is formed into edge 82' at abase thereof. FIG. 13 illustrates the use of a clip 1300 to hold the two panels adjacent to each other, in which case clip 1300 may be inserted either into the small gap between tab 20 and flange 70, to wrap about edges 86 and 82', or special holes may be provided in the flanges to permit clip 1300 to be slipped about two parallel and abutted edges 82–88. FIG. 14 illustrates the concept of fasteners such as wedges or, alternatively, the well-known "Christmas tree" fasteners, which slide readily one direction into a hole or slot, but which tend to resist being removed therefrom owing to the orientation of small protrusions that extend from the surface of the fastener. In this case, fastener 1410 may be passed into slots 1400 and 1405 provided for in adjacent panels. FIG. 15 illustrates another configuration, which may incorporate a small bead 1500 similar to tongue 1000, and a small generally cylindrical groove 1510, similar to groove 1010. However, owing to the geometry of each, bead 1500 will interfere with groove 1510 when edges 82' and 86 are brought together. This interference will similarly prevent the two edges from separating. Further alternatives, such as small pins, v-shaped wedges, or other mating features between two panels are similarly contemplated for application herein, and, based upon the enumerations herein, yet other fastening methods may be apparent to those in the art without departing from the scope of the invention.

When a building is being constructed, structural components are most commonly assembled first, including such components as various studs and joists. Onto this skeleton, additional building materials and components are added. The preferred embodiment panel 10 will preferably be attached early in this construction process, and may be anchored directly to a stud such as structural support 300 of FIG. 3 before any additional siding or other finishing materials are provided. This may be accomplished simply, by running only one or a few nails, screws or other fasteners through one of flanges 30, 40, 50 and 70. However, in some instances the building will support a siding material such as stone or brick, which has somewhat different requirements from metal or vinyl siding. In these instances, flanges 30, 40, 50 and 70 may interfere with the brick or stone, and so these flanges 30, 40, 50 and 70 will most desirably be broken off or removed from panel 10. In this case, a new structure must be provided to attach panel 10 into the underlying building structural components.

Figure 16:
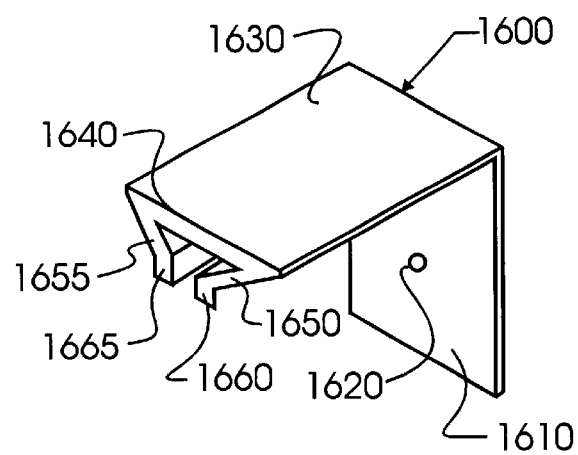
FIGS. 16 and 17 illustrate a preferred embodiment brick or stone clip used to support the preferred embodiment panel from projected and front plan views, respectively.
Figure 17:
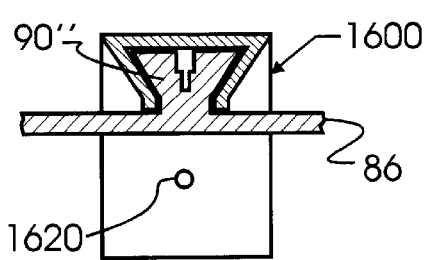
Figure 20:
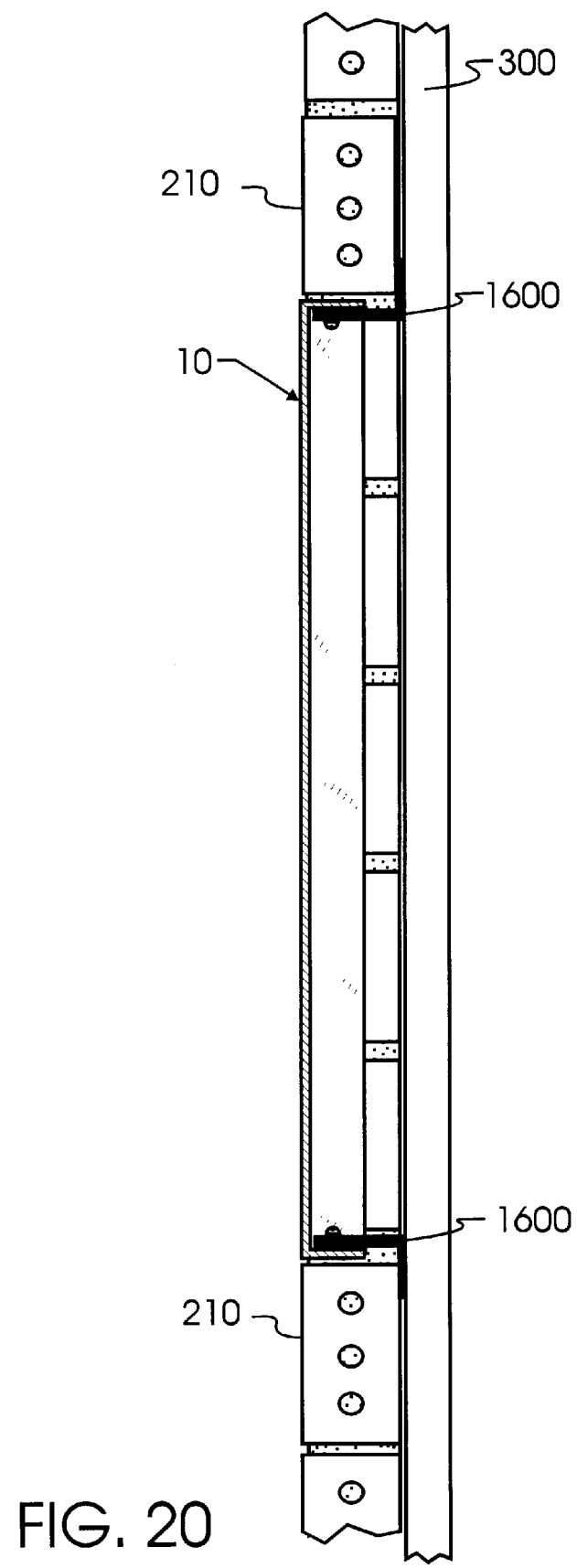
FIG. 20 illustrates a cross-section view looking into a brick wall illustrating the use of the brick or stone clips in association with the preferred embodiment mounting panel.

A preferred bracket 1600 for attaching panel 10, without flanges 30, 40, 50 and 70, to a structural support is illustrated in FIG. 16 from projected view. FIG. 17 illustrates an installed cross-section view, showing the interrelationship between various features of bracket 1600 and fastener guide 90. Bracket 1600 has a flat surface 1610 which is designed to mount against a structural component such as structural support 300. A hole 1620 may be provided through surface 1610 to accommodate a fastener such as a screw or nail. Approximately perpendicular to surface 1610 is another flat surface 1630, which, after installation, will be extending out from the structural support such as structural support 300. Flat surface 1630 terminates at either edge in tapered surfaces 1650, 1655, which each terminate in open terminations 1660, 1665. The purpose of this configuration is best illustrated in FIG. 17, where it can be seen that tapered surfaces 1650, 1655 cooperate with fastener guide 90", to slip over guide 90". Fastener guide 90" is shaped complementary to bracket 1600. Most preferably, once bracket 1600 has been engaged with fastener guide 90", a screw or other fastener will be passed through these components to hold them relative to each other. In this configuration, flat surface 1630 will be inside of an edge 82–88, while surface 1610 will extend beyond the edge so that a fastener may be passed through hole 1620 into the structural support such as structural support 300. This arrangement is illustrated in FIG. 20. From FIG. 20 it will also be apparent that surface 80 may be moved closer to or further from structural support 300, since bracket 1600 and fastener guide 90 are adjustable relative to the amount they overlap each other. Nevertheless, in order to be adjustable in this manner, all four flanges 30, 40, 50 and 70 will most preferably be removed or broken off from panel 10.

Figure 18:
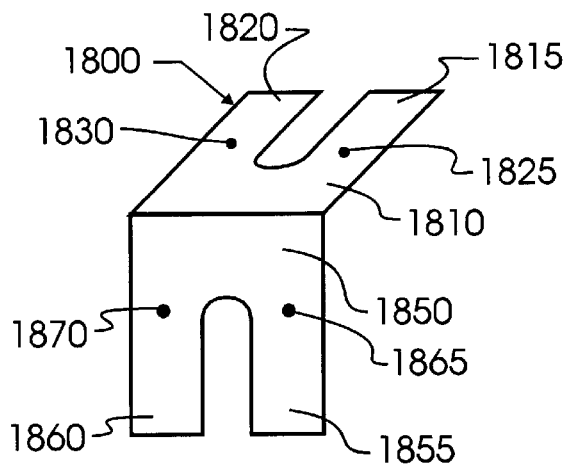
FIG. 18 illustrates a first alternative brick or stone clip.

FIG. 18 illustrates an alternative bracket 1800 having two perpendicular faces 1810 and 1850. Each of these faces include legs 1815, 1820, and 1855, 1860, respectively, and also include mounting holes 1825, 1830 and 1865, 1870 respectively. The gap between adjacent legs 1815 and 1820 serves to receive fastener guide 90 therein. Otherwise, the installation of bracket 1800 is the same as shown in FIG. 20 and described with regard to bracket 1600.

Figure 19:
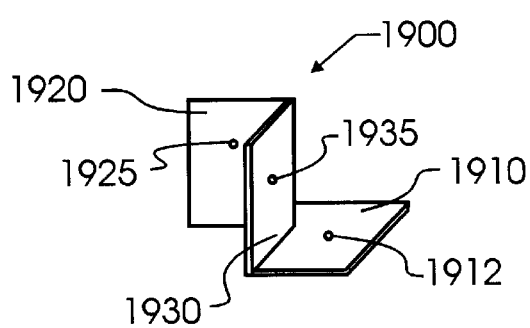
FIG. 19 illustrates a second alternative brick or stone clip.

Second alternative bracket 1900 of FIG. 19 is designed for mounting at the inside corners of panel 10, and so includes a base 1910 which will abut structural support 300, and hole 1912 through which a screw or nail may be passed into structural support 300. Extending from base 1910 are two vertical walls 1920 and 1930 which each have small holes 1925 and 1935, through which fasteners may be passed to attach directly to two of edges 82–88.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims hereinbelow.

I claim:

1. A mounting panel for supporting electrical meters and the like upon a building surface and having features to guide said mounting panel into a mounting position secured adjacent to a second mounting panel of identical construction, comprising:

a generally planar mounting surface which operatively engages a means for securing said electrical meters to said mounting surface;

first and second edges extending out of and in a direction normal to said mounting surface plane from said mounting surface;

a means within said second edge for receiving a first fastener; and at least one flange extending parallel to said mounting surface but offset therefrom having a means for aligning a second edge of said second mounting panel into a position adjacent to and sufficiently aligned with said first edge of said mounting panel to permit said first fastener to fasten said mounting panel first edge to a fastener receiving means of said second mounting panel second edge.

2. The mounting panel of claim 1 wherein said aligning means further comprises a first tab extending from said at least one flange at a first end thereof and a second tab extending from said at least one flange at a second end distal to said first end, said first tab operatively nestable with a second tab.

3. The mounting panel of claim 2 wherein said first and second tabs are thinner than the thickness of said flange and nest to complimentary adjacent tabs by stacking in parallel planes.

4. The mounting panel of claim 1 wherein said generally planar mounting surface is a planar and consistent surface.

5. The mounting panel of claim 4 wherein said generally planar mounting surface will receive a fastener at any point and onto which an electrical meter may operatively be fastened.

6. The mounting panel of claim 1 further comprising a means for guiding said first fastener into said first edge of said mounting panel from a direction normal thereto having two spaced generally linear ridges protruding from said first edge and defining a valley therebetween.

7. The mounting panel of claim 6 further comprising a second elevated portion extending partially and not completely between said two spaced ridges, thereby creating a low region between said spaced ridges and removed from said second elevated portion, said low region operatively dimensioned to receive a penetrating fastener without said fastener passing through said spaced ridges.

8. The mounting panel of claim 1 wherein said first and second edges are opposed to each other, and said fastener guiding means and said fastener receiving means are spaced equidistantly along their respective edges, said second edge having means for reinforcing said fastener receiving means.

9. The mounting panel of claim 1 further comprising a second flange adjacent said first tab which is relatively planar and has a frangible connection to one of said first and second edges, said second flange separating said first edge of said mounting panel from a second mounting panel second edge but removable along said frangible connection to permit said first edge of said mounting panel to directly contact said second mounting panel second edge.

10. A wall-mount panel in combination with a removably mounted electrical meter, said combination engaged with an exterior building vertical wall, comprising:
   a planar and consistent surface which will receive a first fastener at any point and onto which said electrical meter may operatively be fastened by said first fastener;
   four edges extending from said planar and consistent surface in a direction normal thereto, said four edges forming a rectangular perimeter about said planar and consistent surface;
   a means for guiding a second fastener into one of said four edges from a direction normal thereto having two spaced ridges protruding from said one of said four edges and defining a valley therebetween, and a second elevated portion extending partially and not completely between said two spaced ridges, thereby creating a low region between said spaced ridges and removed from said second elevated portion, said low region operatively dimensioned to receive said second fastener without said second fastener passing through said spaced ridges;
   a means for reinforcing a one of said four edges for receiving a third fastener at said reinforcing means, said fastener guiding means and said reinforcing means aligned along opposed ones of said four edges to operatively align when two of said wall mount panels are abutted adjacent each other;
   four relatively planar flanges each having a frangible connection to ones of said four edges and extending parallel to said planar and consistent surface but offset therefrom in a direction normal to said planar and consistent surface, and each extending from said four edges in different directions, at least one of said flanges having a tab comprising a region which is thinner than the thickness of a remainder of said flange and having a notch separating said tab from said remainder of said flange.

11. The panel and meter combination of claim 10 comprising in further combination an additional electrical component.

12. The panel and meter combination of claim 11 wherein said additional electrical component further comprises an additional electrical meter.

13. An expandable mounting panel for mounting electrical meters and the like comprising two adjacent, like modules, each of said modules having flanges for attachment to a building surface and a surface raised from said flanges for supporting various electrical components including electrical meters, wherein the improvement comprises:
   a first engaging tab on a one of said two adjacent, like modules which contacts a second engaging tab on an other of said two adjacent, like modules along a first axis; and
   a first abutting edge on said one of said two adjacent, like modules which contacts a second abutting edge on said other of said two adjacent, like modules along a second axis different from and not parallel to said first axis.

14. The expandable mounting panel of claim 13 wherein each of said two adjacent, like modules further comprises supporting ribs which resist said building surface and said panel surface from being pressed together, said supporting ribs having cut-outs for receiving flanges from an adjacent, like module.

15. The expandable mounting panel of claim 13 further comprising means for fastening said first abutting edge to said second abutting edge.

16. The expandable mounting panel of claim 13 wherein said first axis and said second axis are perpendicular.

* * * * *